Figure 1:
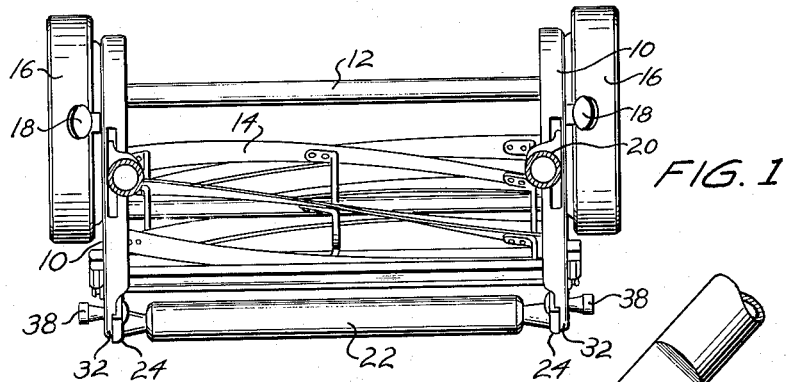

July 12, 1966 R. A. HANSON ETAL 3,260,042
LAWN MOWER ROLLER ADJUSTMENT
Original Filed Aug. 31, 1962

INVENTORS
RUDOLPH A. HANSON
EDWARD J. ZIEGLER
JOHN E. FISCHER
BY Beaman & Beaman
ATTORNEYS ounited States Patent Office  3,260,042
Patented July 12, 1966

3,260,042
LAWN MOWER ROLLER ADJUSTMENT
Rudolph A. Hanson, Edward J. Ziegler, and John E. Fischer, Jackson, Mich., assignors to Yard-Man, Inc., Jackson, Mich., a corporation of Michigan
Original application Aug. 31, 1962, Ser. No. 220,628, now Patent No. 3,178,874, dated Apr. 20, 1965. Divided and this application Feb. 15, 1965, Ser. No. 432,547
3 Claims. (Cl. 56—249)

This invention relates to mower height adjustment structure particularly adaptable with, though not limited to, reel type lawn mowers and more specifically relates to adjustment of a mower roller relative to the frame of the mower. This application is a division of United States application Serial No. 220,628, filed Aug. 31, 1962, now United States Patent 3,178,874.

With an increased demand for more convenient and versatile implements for use in lawn care, it has become necessary to develop and provide lawn mowers which are capable of being easily adjusted to produce the desired cutting characteristics. An important lawn mower adjustment is that of regulating the height of the cut whereby the operator may vary the cutting height in accordance with the ground conditions, weather, type of grass being cut and desired lawn texture. There are many previously known devices for adjusting the height of a lawn mower cut shown in the prior art, although most such devices require the use of wrenches and accomplish adjustment by means of changing the roller position, while no previously known mower is equipped to accomplish the adjustment in the fast, convenient and accurate manner of the present invention.

Accordingly, it is a primary object of this invention to provide an improved, convenient, fast and easily operable lawn mower ground roller height adjustment which will rigidly maintain the desired adjustment and yet provide optimum cutting characteristics and ease of operation.

A further object resides in the provision of adjustable support structure for adjustably mounting the roller of a lawn mower to the mower frame with quick release devices wherein the structure is of a strong and rigid construction, yet is easily produceable and economical to manufacture.

A further object of the invention is to provide a mower ground roller height adjustment which is simple and positive in its operation whereby the brackets which rotatably support the ground roller are maintained in frictional engagement with the frame member, and guide means are associated with the frame member and bracket for guiding the direction of movement of the bracket during adjustment.

Figure 2:
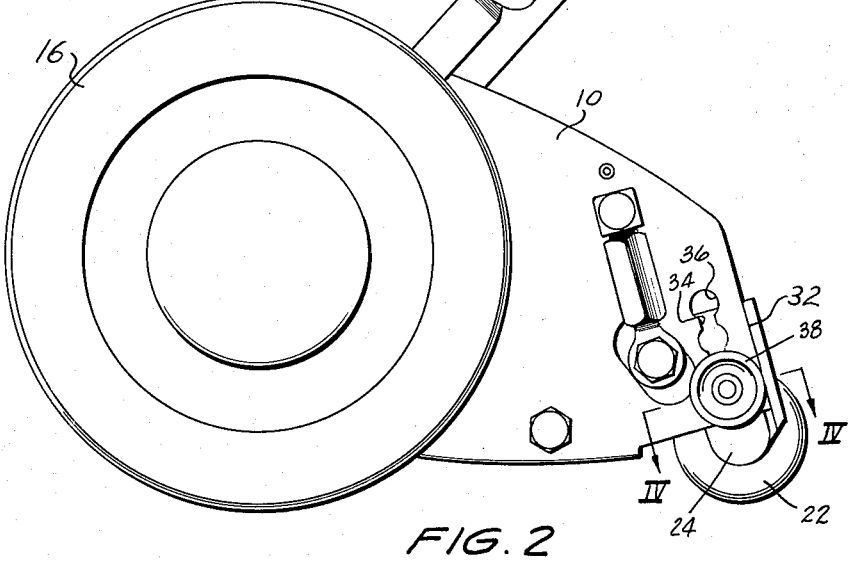
Figure 3:
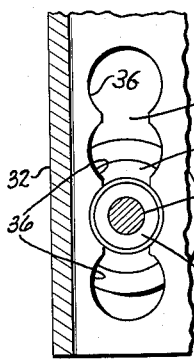
Figure 4:
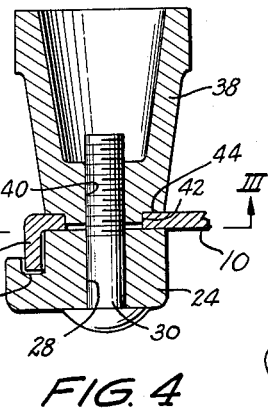

These and other objects of the invention arising from the details and relationships of the components of an embodiment thereof will be apparent from the following description and accompanying drawings wherein:

FIG. 1 is a rear perspective view of a reel type lawn mower constructed in accord with the invention, a portion of the handle being deleted, FIG. 2 is a side elevational view of the lawn mower shown in FIG. 1, the ground roller being in a position near maximum roller height, FIG. 3 is an enlarged, detail section taken along line III—III of FIG. 4, illustrating the ground roller adjustment slot and cooperating adjustment nut, and FIG. 4 is an enlarged, detail section taken on line IV—IV of FIG. 2, illustrating the ground roller adjustment knob and bracket.

FIG. 1 illustrates the general appearance of a reel type lawn mower incorporating the components of the invention. The lawn mower frame consists of a pair of parallel spaced side frame members 10 of generally vertically planar configuration having a substantial portion of their peripheries deflected inwardly to define reinforcing flanges. The two frames 10 are maintained in a spaced rigid relationship by elongated spacing members 12 rigidly affixed, as by rivets or the like, to the planar wall of the frame members 10. A reel 14 is rotatably mounted between the frame members 10 and is driven from the drive wheels 16 in the conventional manner. The drive wheels 16 are vertically adjustable relative to the frame members by levers 18, and other structure more fully described in the aforementioned patent. A handle 20, only partially shown, is pivotally affixed in a conventional manner to the two frame members 10 for pushing and guiding the mower.

When mower cutting height is changed by adjusting the drive wheels 16, it is usually desirable to also adjust the mower ground roller 22 so that the resultant height adjustment of the mower cutter bar will not adversely affect the proper angular relationship of the cutter bar to the grass being cut. Optimum cutting is achieved at a relatively limited angular relation of the cutter bar to the grass whereby the reel blades will effectively cut the grass rather than knock the grass down prior to its reaching the cutter bar.

The ground roller 22 is rotatably mounted on a bracket 24 at each end of the roller. The brackets 24 are of a relatively elongated configuration, having an elongated groove or recess 26 defined therein adjacent one of the longitudinal edges. A hole 28 is located within the bracket for receiving a threaded pin or bolt 30.

The rear edge of each of the frame members 10 is provided with an inwardly turned straight edge flange 32 substantially perpendicularly disposed to the general plane of the associated frame member, and the flange is of such configuration as to be slideably received within the bracket groove 26. The cooperating flange and groove relationship functions as a guide to enable a linear movement of the bracket 24 to facilitaate its adjustment up and down relative to the associated frame 10.

A slot 34 is made in each frame member 10 adjacent its rear edge flange 32 and substantially parallel to the flange. The slots 34 are provided with a plurality of holes or recesses 36 of enlarged dimension, axially spaced along and symmetrical with respect to the longitudinal axis of the slot. The holes 36 are circular in configuration and the slot 34 is of a width slightly greater than the diameter of the bolt 30, and enables the threaded bolt to freely project therethrough. A nut 38, in the form of a knob in the illustrated embodiment, is provided with a threaded bore 40 for operatively associating with the threads of the bolt. The end of the knob nut 38 is provided with a slightly conical pilot projection 42, concentric to the threaded bore 40, to be closely received within the holes 36 in slot 34. A shoulder 44 on the knob nut 38, adjacent the pilot projection 42, engages against the frame member when the pilot projection 42 is fitted within a hole 36, as is shown in FIG. 4.

Adjustment of the ground roller is accomplished by unscrewing the knob nut 38 sufficiently to withdraw the pilot projection 42 from the associated hole or recess 36. Thereupon, the knob nut, bolt, bracket and roller may be shifted as a unit relative to the frame member to the desired new height position where the cylindrical pilot projection is aligned with another hole 36. The knob nut is then tightened upon the bolt, to place the projection 42 within the desired hole, by securely clamping the nut shoulder 44 in engagement with the outer surface of the associated frame member 10. Tightening of the knob nut will tension the bolt and maintain a tight frictional engagement of the bracket 24 with the inner surface of the associated frame member 10. The brackets at each end of the ground roller are adjusted in an identical manner.

From the foregoing description, it will be appreciated that the invention is directed to ground roller adjustment features for lawn mowers which are economical to manufacture, may be easily operated by unskilled operators without requiring special tools, and that a rugged and substantial lawn mower construction is possible without the need of expensive castings and the like.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. A lawn mower comprising, in combination, a frame member having a general plane of configuration, a ground roller, an elongated flange defined on said frame member substantially perpendicularly related to the general plane thereof, an elongated slot defined in said frame member having a longitudinal axis substantially parallel to said flange, a plurality of circular holes defined in said frame member intersecting said slot whereby the slot longitudinal axis diametrically intersects said holes, said holes being of greater diameter than the width of said slot and being spaced apart along the length thereof, a bracket rotatably supporting an end of said roller, an elongated recess defined in said bracket slideably receiving said flange, a threaded pin mounted in said bracket extending through said slot and slideable therealong, a nut member having a threaded bore operatively associated with said pin located on the opposite side of said frame member with respect to said bracket, a projection defined on said nut member concentric to said bore and closely receivable within a selected one of said holes and a shoulder defined on said nut member transversely related to said threaded bore and adapted to engage said frame upon said projection being received within a hole, said shoulder limiting the degree of entrance of said projection into the associated hole and forming the thrust bearing surface of said nut member as said pin is tensioned by tightening said nut member on said pin.

2. A lawn mower as defined in claim 1, wherein said nut member comprises a knob and said pin comprises a bolt mounted upon said bracket.

3. A lawn mower comprising, in combination, a frame member having a general plane of configuration, a rear edge and inner and outer surfaces, a ground roller, said rear edge of said frame member being deflected from the general plane of said frame member in the direction of said inner surface thereof to define an elongated flange transversely related to the general plane of said frame member, an elongated slot defined in said frame member adjacent said flange and having a longitudinal axis substantially parallel to said flange, a plurality of holes defined in said frame member intersecting said inner and outer surfaces and intersecting said slot whereby the slot longitudinal axis diametrically intersects said holes, said holes being of greater diameter than the width of said slot and being spaced along the length thereof, a bracket rotatably supporting an end of said roller, an elongated recess defined in said bracket slidably receiving said flange whereby said flange and recess guide movement of said bracket on said frame member, said bracket including an inner surface adapted to engage said frame inner surface upon said flange being received within said recess, a threaded bolt mounted on said bracket and extending from said bracket inner surface, said bolt having a diameter less than the transverse dimension of said slot and extending through said slot whereby movement of said bracket upon said frame member positions said bolt within said slot, a knob having a threaded bore receiving said bolt, said knob being disposed adjacent the frame member outer surface and including a projection concentrically related to said threaded bore having a transverse cross section corresponding to said frame member holes and closely receivable within a selected one of said holes, and a shoulder defined on said knob adjacent said projection and perpendicularly disposed to the axis of said threaded bore adapted to engage said frame member outer surface upon said projection being aligned and received within one of said holes and said knob being tightened on said bolt, said shoulder limiting the degree of entrance of said projection into the associated hole and forming the thrust bearing surface of said knob as the knob is tightened on said bolt.

References Cited by the Examiner

UNITED STATES PATENTS

| 208,788 | 10/1878 | Braun | 56—253 |
| 503,904 | 8/1893 | Deck | 56—254 |
| 566,911 | 9/1896 | Johnston | 56—254 |
| 1,412,583 | 4/1922 | Vannette | 56—252 |
| 2,425,106 | 8/1947 | Madsen | 56—250 |

FOREIGN PATENTS

| 140,703 | 4/1951 | Australia. |

ABRAHAM G. STONE, *Primary Examiner.*

RUSSELL R. KINSEY, *Examiner.*